US012794289B2

(12) United States Patent
Yamada et al.

(10) Patent No.: US 12,794,289 B2
(45) Date of Patent: Nov. 10, 2026

(54) MOTOR WITH IMPROVED OUTPUT TORQUE

(71) Applicant: MINEBEA MITSUMI Inc., Nagano (JP)

(72) Inventors: Takuji Yamada, Kitasaku-gun (JP); Toru Watanabe, Kitasaku-gun (JP)

(73) Assignee: MINEBEA MITSUMI INC., Nagano (JP)

( * ) Notice: Subject to any disclaimer, the term of this patent is extended or adjusted under 35 U.S.C. 154(b) by 233 days.

(21) Appl. No.: 18/684,988

(22) PCT Filed: Aug. 31, 2021

(86) PCT No.: PCT/JP2021/031982
§ 371 (c)(1),
(2) Date: Feb. 20, 2024

(87) PCT Pub. No.: WO2023/032040
PCT Pub. Date: Mar. 9, 2023

(65) Prior Publication Data

US 2024/0356399 A1 Oct. 24, 2024

(51) Int. Cl.
*H02K 1/278* (2022.01)
*H02K 1/276* (2022.01)
(Continued)

(52) U.S. Cl.
CPC ........... *H02K 1/278* (2013.01); *H02K 1/2766* (2013.01); *H02K 1/2783* (2022.01);
(Continued)

(58) Field of Classification Search
CPC .... H02K 1/278; H02K 1/2783; H02K 1/2766; H02K 1/2792; H02K 15/035
(Continued)

(56) References Cited

U.S. PATENT DOCUMENTS 5,300,910 A * 4/1994 Unkelbach ........... H01F 7/0284
335/302
8,076,812 B2 12/2011 Hiroshi
(Continued)

FOREIGN PATENT DOCUMENTS

CN 102157998 A * 8/2011 ............... H02K 1/27
CN 108736608 A * 11/2018 ............. H02K 1/276
(Continued)

OTHER PUBLICATIONS

English translation of Written Opinion for corresponding International Application No. PCT/JP2021/031982 dated Oct. 26, 2021.
(Continued)

*Primary Examiner* — Oluseye Iwarere
*Assistant Examiner* — Daniel K Schlak
(74) *Attorney, Agent, or Firm* — Chrisman Gallo Tochtrop LLC

(57) ABSTRACT

A motor includes: a rotor including a yoke, a first magnet, and a second magnet opposing the first magnet; and a stator. The yoke includes a hole and a frame surrounding the hole. The first magnet is disposed in the hole of the yoke. The second magnet includes a first surface opposing the frame of the yoke in the peripheral direction and a second surface opposing the stator in the radial direction.

24 Claims, 11 Drawing Sheets

(51) Int. Cl.
*H02K 1/2783* (2022.01)
*H02K 1/2792* (2022.01)
*H02K 15/035* (2025.01)

(52) U.S. Cl.
CPC ......... *H02K 1/2792* (2022.01); *H02K 15/035* (2025.01); *H02K 2201/03* (2013.01)

(58) Field of Classification Search
USPC ...................................................... 310/156.07
See application file for complete search history.

(56) References Cited

U.S. PATENT DOCUMENTS 9,595,851 B2 3/2017 Hazeyama et al.
9,634,527 B2 4/2017 Zhang et al.
9,634,528 B2 4/2017 Zhang et al.
9,735,631 B2 * 8/2017 Kayano ................ H02K 1/2766
9,831,726 B2 11/2017 Zhang et al.
9,876,397 B2 1/2018 Zhang et al.
2002/0180295 A1 * 12/2002 Kaneda ................ H02K 1/2783 310/156.43
2005/0040721 A1 * 2/2005 Kusase ................ H02K 1/2783 310/156.43
2005/0162029 A1 * 7/2005 Tajima ................... H02K 1/276 310/156.53
2006/0255894 A1 * 11/2006 Enomoto ............... H02K 1/278 335/302
2010/0225191 A1 * 9/2010 Hiroshi ................ H02K 1/2766 310/156.38
2014/0084731 A1 * 3/2014 Iwami ...................... H02K 1/02 310/156.07
2014/0252904 A1 * 9/2014 Mikami ................. H02K 1/243 310/156.66
2014/0375160 A1 * 12/2014 Zhang ...................... H02K 1/06 310/154.26
2015/0001970 A1 1/2015 Zhang et al.
2015/0001977 A1 1/2015 Zhang et al.
2015/0001980 A1 1/2015 Zhang et al.
2015/0061444 A1 * 3/2015 Kamiya ................. H02K 1/278 310/156.12
2015/0357870 A1 * 12/2015 Hazeyama ........... H02K 1/2766 310/156.07
2016/0126794 A1 * 5/2016 Gery .................... H02K 1/2753 310/156.01
2018/0034332 A1 * 2/2018 Takahashi ................ H02K 9/19
2018/0316234 A1 11/2018 Ikawa et al.
2019/0229573 A1 * 7/2019 Zhao .................... H02K 1/2783
2019/0273405 A1 * 9/2019 Ho ........................... H02K 1/17
2020/0036246 A1 * 1/2020 Saban .................. H02K 1/2783
2020/0177036 A1 * 6/2020 Yokoyama ............. H02K 15/03
2020/0244119 A1 * 7/2020 Morishita ............ H02K 1/2786
2021/0175785 A1 * 6/2021 Deng ..................... H02K 1/146
2022/0068559 A1 * 3/2022 Zhou .......................... H01F 7/02
2022/0103035 A1 * 3/2022 Kani .................... H02K 1/2783
2022/0181930 A1 * 6/2022 Tsuchiya ................ H02K 15/03
2022/0181932 A1 * 6/2022 Tanaka ................. H02K 1/2783
2022/0194210 A1 * 6/2022 Takahashi ................ B60K 1/02
2022/0344985 A1 * 10/2022 Morishita ................ H02K 1/17
2022/0344986 A1 * 10/2022 Okitsu ................... H02K 1/276
2023/0155432 A1 * 5/2023 Ueda .................... H02K 1/2783 310/156.56
2024/0171052 A1 * 5/2024 Du ......................... H02K 21/12
2025/0062648 A1 * 2/2025 Hu ....................... H02K 1/2783
2025/0309710 A1 * 10/2025 Hu ....................... H02K 1/2783

FOREIGN PATENT DOCUMENTS

CN 110504773 A * 11/2019 ............. H02K 15/03
EP 3648310 A1 * 5/2020 ............... H02K 1/06
JP 2007-006545 A 1/2007
JP 2010-207067 A 9/2010
JP 2015-525051 A 8/2015
JP 2016-119769 A 6/2016
JP 2020-072634 A 5/2020
JP 2021-083223 A 5/2021
WO 2014/115655 A1 7/2014

OTHER PUBLICATIONS

International Search Report for corresponding International Application No. PCT/JP2021/031982 mailed Oct. 26, 2021.
Written Opinion for corresponding International Application No. PCT/JP2021/031982 dated Oct. 26, 2021.

* cited by examiner

MOTOR WITH IMPROVED OUTPUT TORQUE

CROSS-REFERENCE TO RELATED APPLICATIONS

This application is a national stage entry of International Application No. PCT/JP2021/031982 filed on Aug. 31, 2021, the entire disclosures of which are hereby incorporated herein by reference.

TECHNICAL FIELD

The present invention relates to a motor.

BACKGROUND ART

There is known a so-called Halbach array motor where a plurality of magnets having different directions of magnetic flux are disposed at a surface of a rotor yoke. In the Halbach array motor, for example, in a motor having an inner rotor structure, a technique is known where a magnet is embedded in a magnet holding member to suppress jumping out of the magnet due to centrifugal force during rotation.

CITATION LIST

Patent Literature

Patent Document 1: JP 2007-006545 A
Patent Document 2: JP 2010-207067 A
Patent Document 3: WO 2014/115655

SUMMARY OF INVENTION

Technical Problem

However, in the Halbach array motor, the amount of magnetic flux flowing from the magnet to the stator side may decrease. In this case, output torque of the motor decreases.

In one aspect, an object is to provide a motor capable of improving the output torque.

Solution to Problem

In one aspect, a motor includes: a rotor including a yoke, a first magnet, and a second magnet opposing the first magnet; and a stator. The yoke includes a hole and a frame surrounding the hole. The first magnet is disposed in the hole of the yoke. The second magnet includes a first surface opposing the frame of the yoke in a peripheral direction and a second surface opposing the stator in a radial direction.

According to the one aspect, output torque can be improved.

DESCRIPTION OF EMBODIMENTS

Figure 1:
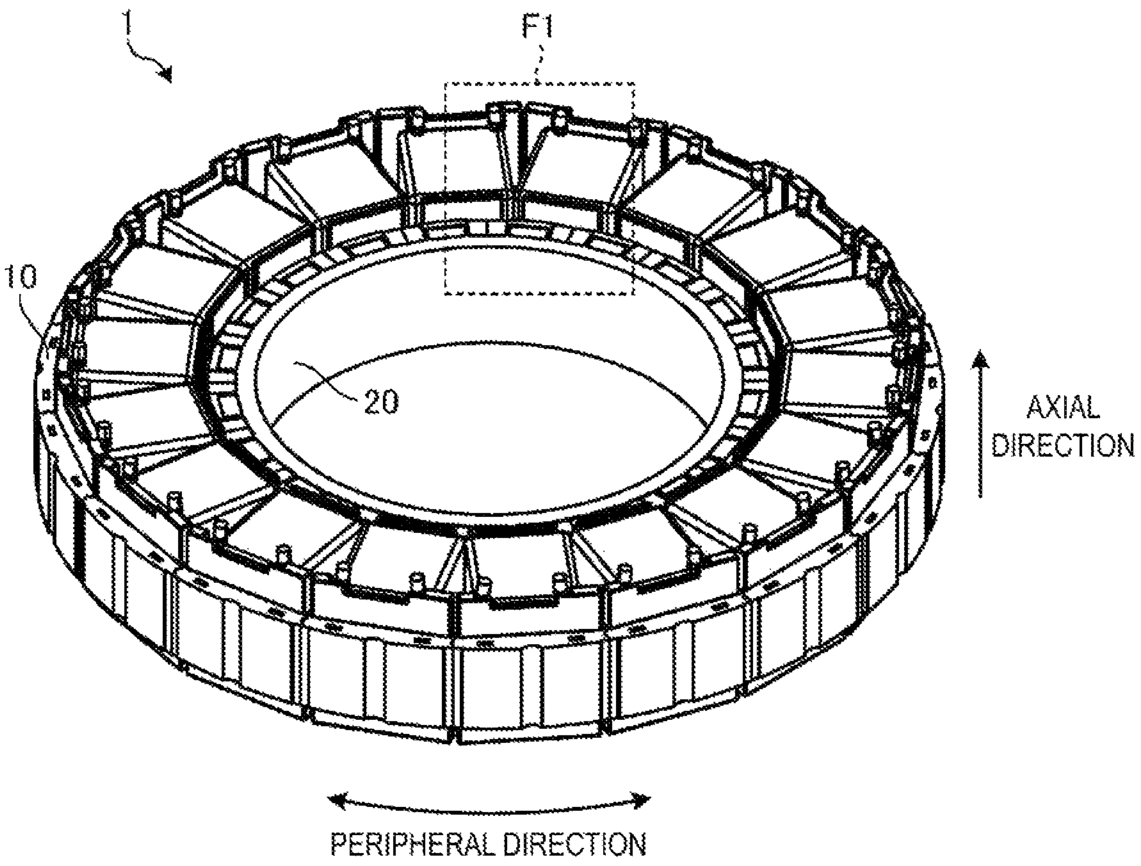
FIG. 1 is a perspective view illustrating an example of a motor of an embodiment.

An embodiment of a motor disclosed in the present application will be described below in detail with reference to the drawings. Note that dimensional relationships between elements and ratios of elements in the drawings may differ from actual configurations. The drawings may include parts having mutually different dimensional relationships and proportions. For the sake of clarity, a coordinate system with an extension direction of rotation axis of the motor defined as an axial direction may be used in the drawings.

Embodiments

Figure 2:
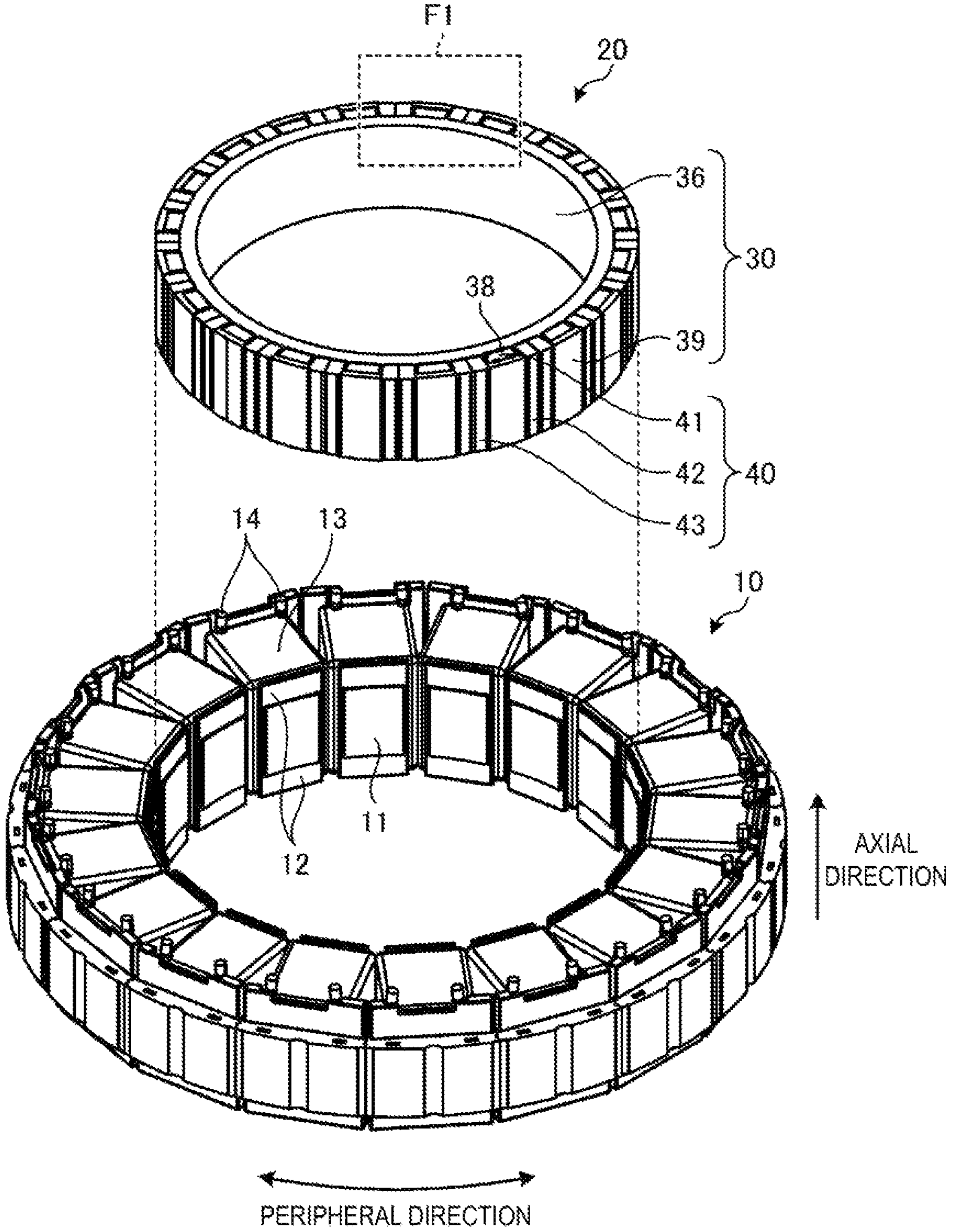
FIG. 2 is an exploded perspective view illustrating an example of the motor of the embodiment.

First, a motor of an embodiment will be described with reference to FIG. 1 and FIG. 2. FIG. 1 is a perspective view illustrating an example of the motor of the embodiment. FIG. 2 is an exploded perspective view illustrating an example of the motor of the embodiment. As illustrated in FIG. 1, a motor 1 of the embodiment includes a stator 10 and a rotor 20. The motor 1 of the embodiment is a so-called flat motor, for example. In the flat motor, the length of a stator core in the radial direction is larger than the length of the stator core in the axial direction. The motor 1 is accommodated in a frame (not illustrated), for example, and transmits driving force to the outside through a rotation axis (not illustrated).

As illustrated in FIG. 2, the stator 10 includes a stator core 11, an insulator 12, and a coil 13. The stator core 11 is formed by stacking, in an axial direction, a plurality of plate-shaped metal members or magnetic bodies such as silicon steel plates, electromagnetic steel plates, or soft magnetic steel plates, for example. The insulators 12 is formed of an insulation body such as resin, for example, and mounted to the stator core 11 from the positive direction side and the negative direction side in the axial direction. The coil 13 is wound around the stator core 11 via the insulator 12. As illustrated in FIG. 2, end portions 14 of the conducting wire are drawn from the coil 13 in the same direction (positive direction side in the axial direction) as draw wires. The end portions 14 of the conducting wire are used as terminals of the coil 13, for example.

As illustrated in FIG. 1 and FIG. 2, the rotor 20 is disposed at the inner peripheral side of the stator 10 in the radial direction. That is, the motor 1 of the embodiment is an inner rotor motor. As illustrated in FIG. 2, the rotor 20 includes a yoke 30 forming a magnetic path, a plurality of first magnets 41, a plurality of second magnets 42, and a plurality of third magnets 43. Note that in the following, the first magnet 41 to the third magnet 43 may be referred to as a magnet 40 when expressed without distinction. The first magnet 41 may be referred to as a main magnet, and the second magnet 42 and the third magnet 43 may be referred to as auxiliary magnets. In the embodiment, two types of auxiliary magnets 42 and 43 are disposed for one main magnet 41.

The yoke 30 is a yoke formed of iron, for example, and includes an annular portion 36, a hole 38, and a frame 39 surrounding the hole 38. The yoke 30 includes a plurality of holes 38 and a plurality of frames 39. As illustrated in FIG. 2, the annular portion 36 extends in the peripheral direction. The plurality of frames 39 are formed and aligned at equal intervals in the peripheral direction, for example. Note that in the following embodiment and variations, the material of the yoke is not limited to iron but may be other magnetic bodies.

The first magnet 41 is disposed in the hole 38 surrounded by the frame 39, and the second magnet 42 and the third magnet 43 are disposed between two frames 39 adjacent to each other in the peripheral direction. In the embodiment, two auxiliary magnets 42 and 43 are disposed between the two frames 39 adjacent to each other in the peripheral direction.

Figure 3:
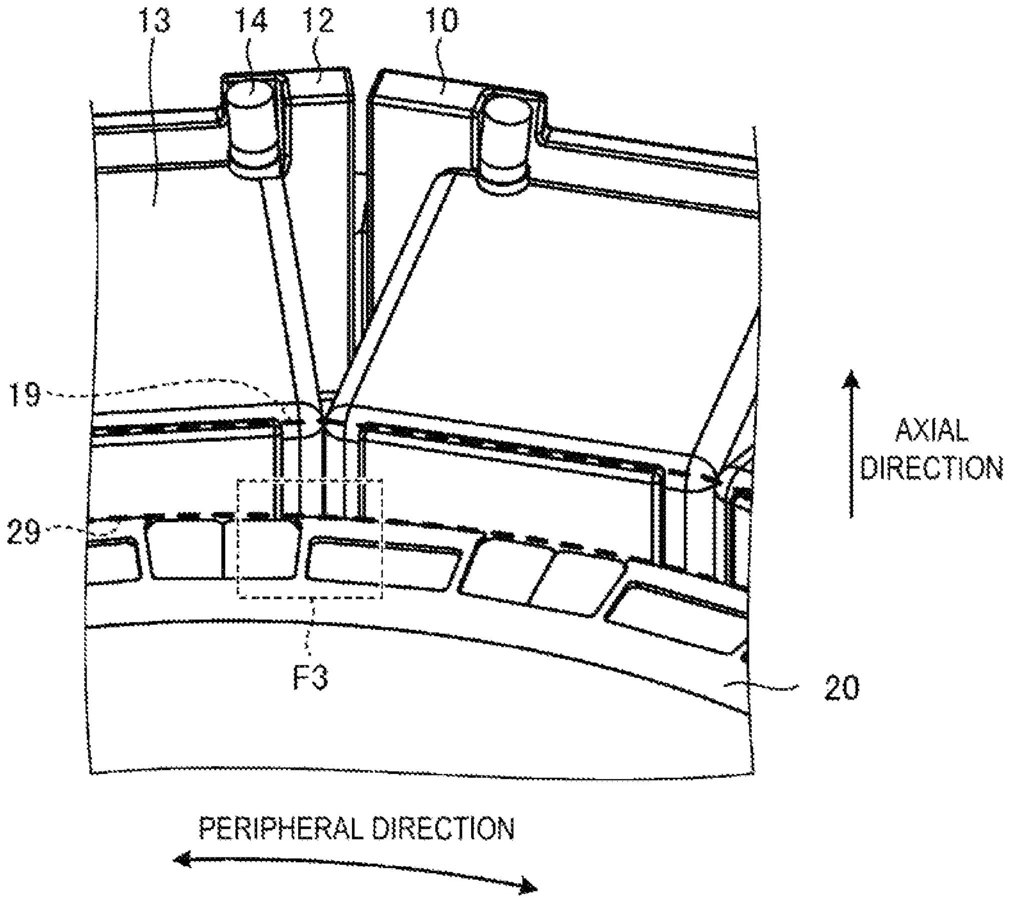
FIG. 3 is an enlarged perspective view illustrating an example of the motor of the embodiment.
Figure 4:
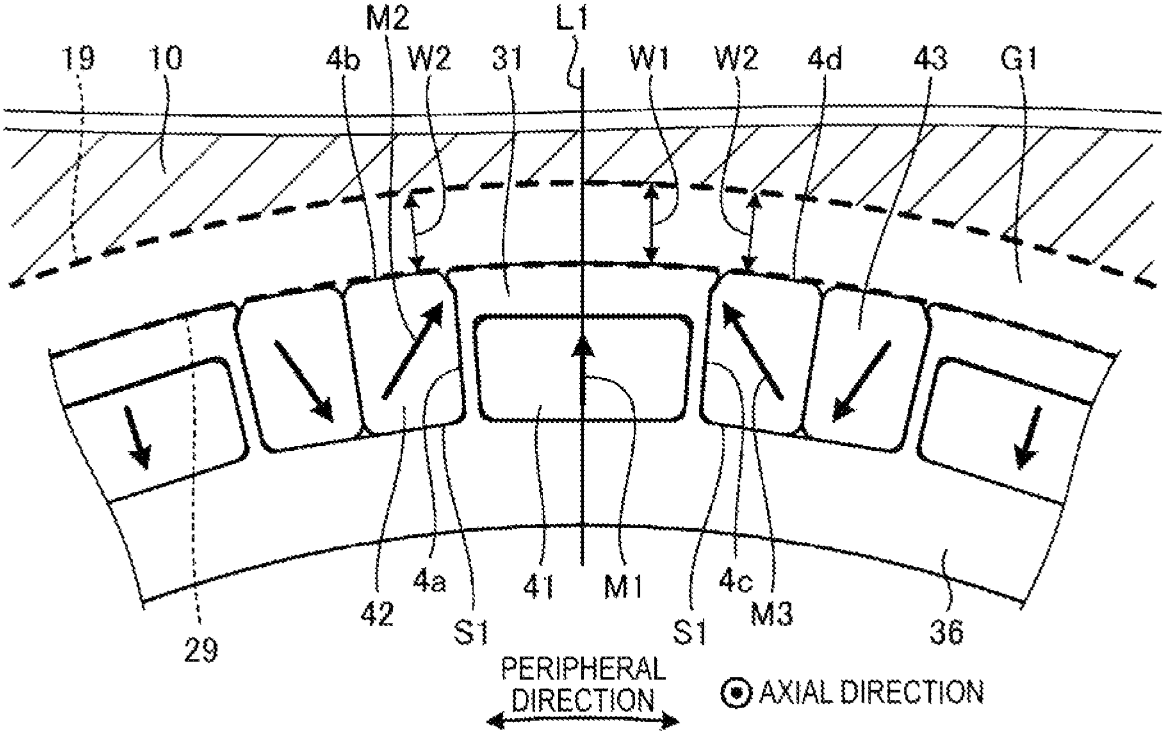
FIG. 4 is an enlarged top view illustrating an example of the motor of the embodiment.

In the embodiment, the second magnet 42 and the third magnet 43 have substantially the same shape but have different directions of magnetic flux as will be described later. The second magnet 42 and the third magnet 43 are disposed laterally symmetrically with respect to a straight line L1, illustrated in FIG. 4, connecting the center of the first magnet 41 in the peripheral direction and the center of the rotor 20. FIG. 3 is an enlarged perspective view illustrating an example of the motor of the embodiment. FIG. 4 is an enlarged top view illustrating an example of the motor. FIG. 3 and FIG. 4 are enlarged views of the portion illustrated in a frame F1 in FIG. 1. Note that in FIG. 4, the stator 10 is illustrated in a simplified manner.

As illustrated in FIG. 4, a magnetic gap G1 extending in the peripheral direction is formed in the radial direction between an inner peripheral surface 19 of the stator 10 and an outer peripheral surface 29 of the rotor 20 illustrated in FIG. 3 and FIG. 4. The magnetic gap G1 includes a first portion formed between the stator 10 and a first wall 31 of the frame 39 of the rotor 20, a second portion formed between the stator 10 and the second magnet 42, and a third portion formed between the stator 10 and the third magnet 43. As illustrated in FIG. 4, a radial width of the magnetic gap G1 in the first portion is W1, and radial widths of the magnetic gap G1 at the second portion and the third portion are W2.

As illustrated in FIG. 4, the second magnet 42 is adjacent to a side surface of the annular portion 36 at the magnetic gap G1 side in the radial direction, for example, a side surface S1 at the outer side in the radial direction. The third magnet 43 is also adjacent to the side surface S1 of the annular portion 36.

Figure 5:
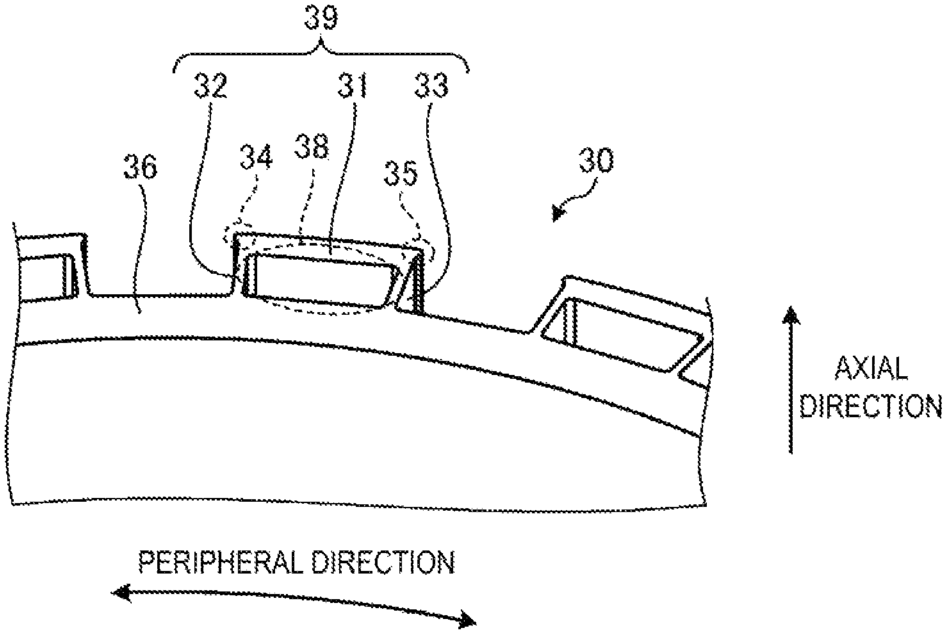
FIG. 5 is an enlarged perspective view illustrating an example of a rotor of the embodiment where a magnet is removed.

As illustrated in FIG. 5, the frame 39 of the yoke 30 is formed by the first wall 31, a second wall 32, and a third wall 33. FIG. 5 is an enlarged perspective view illustrating an example of the rotor according to the embodiment where magnets are removed. FIG. 5 illustrates a state before the first magnet 41, the second magnet 42, and the third magnet 43 are disposed to the rotor 20 illustrated in FIG. 4.

As illustrated in FIG. 5, in the embodiment, the second wall 32 and the third wall 33 are adjacent to the annular portion 36 in the radial direction and extend in the radial direction. The first wall 31 extends in the peripheral direction and is coupled to the annular portion 36 via the second wall 32 and the third wall 33 in the radial direction. The hole 38 is surrounded by a frame 39 including the first wall 31, the second wall 32, and the third wall 33.

Figure 6:
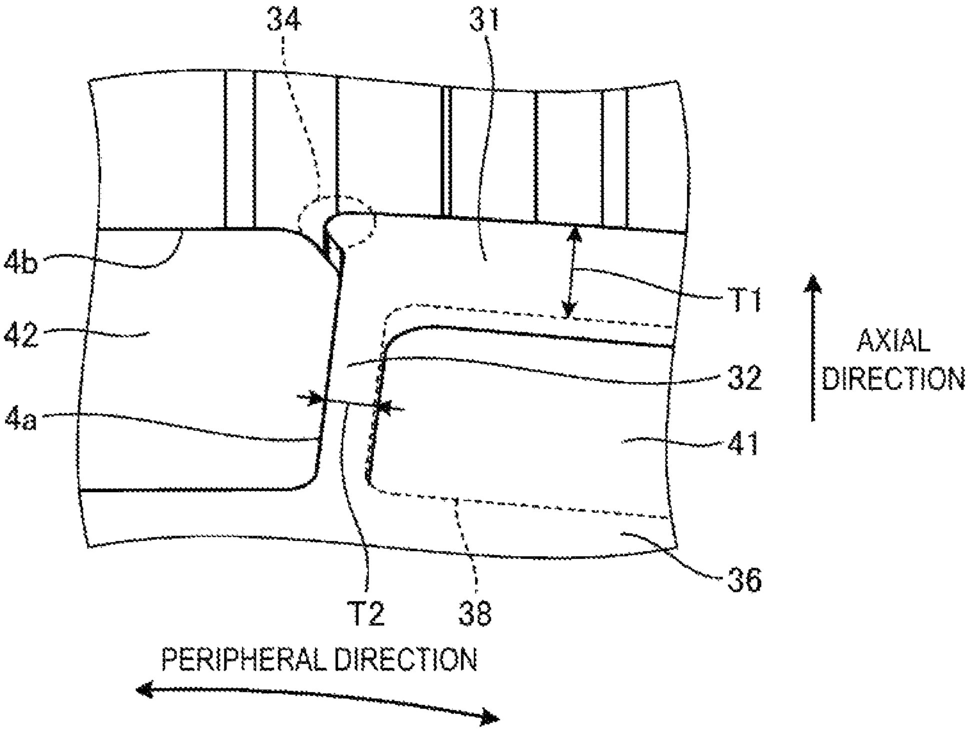
FIG. 6 is an enlarged perspective view illustrating an example of the rotor of the embodiment.

As illustrated in FIG. 6, the first magnet 41 accommodated in the hole 38 is positioned between the first wall 31 and the annular portion 36 in the radial direction. FIG. 6 is an enlarged perspective view illustrating an example of the rotor of the embodiment. FIG. 6 is an enlarged view of a portion illustrated in a frame F3 in FIG. 3.

As illustrated in FIG. 6, in the embodiment, a thickness T1 of the first wall 31 in the radial direction is larger than a thickness T2 of the second wall 32 in the peripheral direction. In the embodiment, the thickness of the third wall 33 in the peripheral direction is substantially the same as the thickness T2 of the second wall 32. That is, the thickness T1 of the first wall 31 is larger than the thickness of the third wall 33 in the peripheral direction.

As illustrated in FIG. 5 and FIG. 6, in the frame 39, an engaging portion 34 is formed at a portion where the first wall 31 and the second wall 32 intersect with each other. Similarly, in the frame 39, an engaging portion 35 is formed at a portion where the first wall 31 and the third wall 33 intersect with each other. Note that the engaging portion 35 is an example of other engaging portions. In the illustrated example, a corner portion of the second magnet 42 (at or near a portion where a first surface **4*a* and a second surface 4*b* of the outer peripheral portion intersect with each other) and a corner portion of the third magnet 43 (at or near a portion where the first surface 4*c* and the second surface 4*d* of the outer peripheral portion intersect with each other) are engaged portions with respect to the engaging portion 34 and the engaging portion 35, respectively. The engaging portions 34 and 35 are formed as protruding portions. The engaging portions 34 and 35 extend toward corner portions (outer peripheral portions) of the second magnet 42 and the third magnet 43. The engaging portions 34 and 35 oppose the corner portions of the second magnet 42 and the third magnet 43**.

As illustrated in FIG. 4 and FIG. 6, the second magnet 42 includes the first surface **4*a* and the second surface 4*b*. The first surface 4*a* opposes the frame 39 of the yoke 30 in the peripheral direction. In an example, the first surface 4*a* opposes the second wall 32 of the frame 39. For example, in the embodiment, the first surface 4*a* is in contact with the second wall 32 of the frame 39 in the peripheral direction. The second surface 4*b* opposes the stator 10 in the radial direction. Similarly, as illustrated in FIG. 4, the third magnet 43 includes a first surface 4*c* opposing the third wall 33 of the frame 39 and a second surface 4*d* opposing the stator 10. In an example, the second surface 4*b* of the second magnet 42 directly opposes the stator 10 via the magnetic gap G1 in the radial direction, and the second surface 4*d* of the third magnet 43 directly opposes the stator 10** via the magnetic gap G1 in the radial direction.

In the embodiment, the second magnet 42 and the third magnet 43 oppose the first magnet 41. In the peripheral direction, the second wall 32 is located between the first magnet 41 and the first surface **4*a* of the second magnet 42, and the third wall 33 is located between the first magnet 41 and the first surface 4*c* of the third magnet 43. For example, as illustrated in FIG. 4 and FIG. 6, the second magnet 42 opposes the first magnet 41 in the peripheral direction with the second wall 32 interposed. As illustrated in FIG. 4, the third magnet 43 opposes the first magnet 41 in the peripheral direction with the third wall 33** interposed.

Returning to FIG. 4, the magnetic flux of the first magnet 41 is directed in a direction indicated by an arrow M1, for example, radially outward (the stator 10 side). In the embodiment, the first wall 31 is positioned in the direction MI with respect to the first magnet 41. The magnetic flux of the first magnet 41 is directed in the direction M1. In an example, the first wall 31 is disposed radially outward of the first magnet 41. Such a configuration suppresses jumping out of the first magnet 41 from the rotor 20 due to a centrifugal force or a repulsive force of the magnet during rotation of the rotor 20.

The magnetic flux of the second magnet 42 is directed in a direction M2 inclined in the peripheral direction with respect to the direction M1 of the magnetic flux of the first magnet 41. Similarly, a direction M3 of the magnetic flux of the third magnet 43 is directed in the direction M3 inclined in the peripheral direction with respect to the direction M1 of the magnetic flux of the first magnet 41. The direction M3 is different from the direction M2 of the magnetic flux of the second magnet 42.

Furthermore, the second magnet 42 engages with the engaging portion 34, and the third magnet 43 engages with the engaging portion 35. In an example, as illustrated in FIG. 4 and FIG. 6, the engaging portion 34 is disposed in accordance with the direction M2 of the magnetic flux of the second magnet 42. The engaging portion 35 is disposed in accordance with the direction M3 of the magnetic flux of the third magnet 43. In the embodiment, the engaging portion 34 is disposed radially outward of the second magnet 42, and the engaging portion 35 is disposed radially outward of the third magnet 43. Such a configuration suppresses jumping out of the second magnet 42 and the third magnet 43 from the rotor 20 due to a centrifugal force or a repulsive force of the magnet during rotation of the rotor 20.

No magnetic body is disposed at each of the second surfaces 4*b* and 4*d* as radially outer surfaces of the second magnet 42 and the third magnet 43. In other words, the yoke 30 is not disposed radially outward of the second magnet 42 and the third magnet 43. Each of the second magnet 42 and the third magnet 43 directly opposes the stator 10 in the radial direction. Accordingly, the magnetic flux of the second magnet 42 and the third magnet 43 easily flows to the stator 10, and the circulation of the magnetic flux between the second magnet 42 and the third magnet 43 is suppressed.

As illustrated in FIG. 4 and FIG. 6, by increasing the width T1 of the first wall 31 of the yoke 30, the radially outer surface of the first magnet 41 is positioned radially inward of the second surface 4*b* of the second magnet 42 and the second surface 4*d* of the third magnet 43. Accordingly, the circulation of the magnetic flux by the second magnet 42 and the third magnet 43 is suppressed, and thus the magnetic flux flowing to the stator 10 is increased. By reducing the thickness of the second wall 32 and the third wall 33 in the peripheral direction, the second wall 32 and the third wall 33 are magnetically saturated. Thus, the circulation of the magnetic flux by the second magnet 42 and the third magnet 43 is suppressed, and the magnetic flux flowing to the stator 10 is further increased.

As described above, the motor 1 of the embodiment includes: the rotor 20 including the yoke 30, the first magnet 41, and the second magnet 42 adjacent to the first magnet 41; and the stator 10. The yoke 30 includes the hole 38 and the frame 39 surrounding the hole 38. The first magnet 41 is disposed in the hole 38 of the yoke 30. The second magnet 42 includes the first surface 4*a* opposing the frame 39 of the yoke 30 in the peripheral direction and the second surface 4*b* opposing the stator 10 in the radial direction. Such a configuration increases the magnetic flux flowing from the magnets 41 to 43 to the stator 10, and thus can improve the output torque.

Variations

Figure 7:
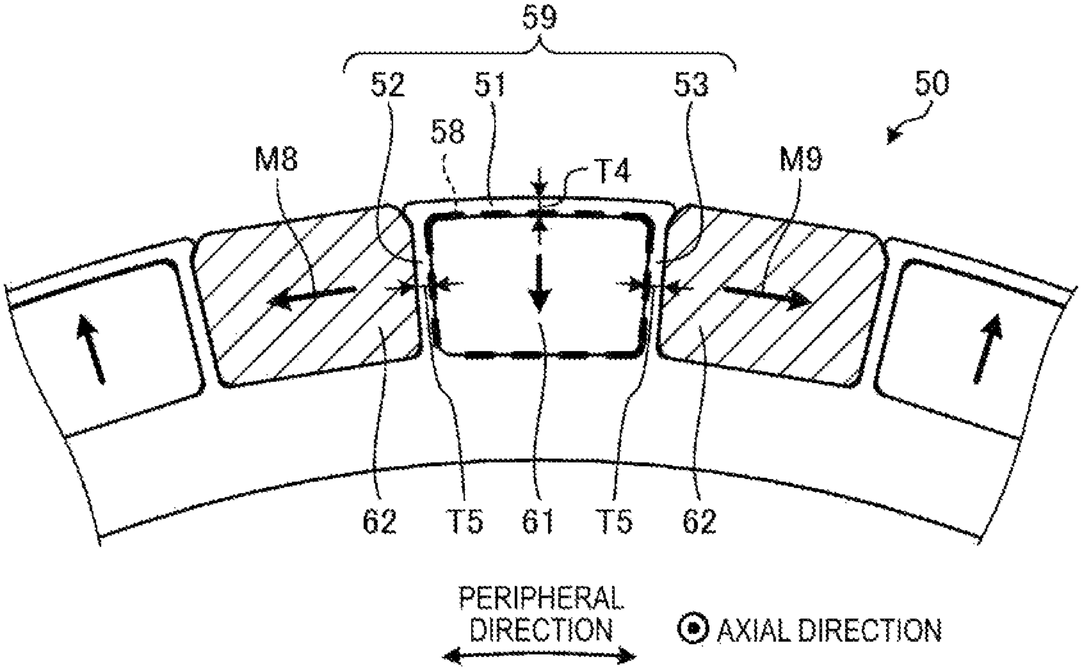
FIG. 7 is an enlarged top view illustrating an example of a rotor of a first variation.

The configuration according to the embodiment has been described above, but embodiments are not limited to this embodiment. For example, although the configuration including the two types of auxiliary magnets 42 and 43 has been described, no such limitation is intended. As illustrated in FIG. 7, a configuration including only one type of auxiliary magnet may be employed. The relationship between the thickness of the first wall 31 and the thicknesses of the second wall 32 and the third wall 33 in the frame 39 of the embodiment is not limited to the relationship illustrated in FIG. 6. FIG. 7 is an enlarged top view illustrating an example of a rotor of a first variation. Note that in the following variations, the same components as the components illustrated in the above-described drawings are denoted with the same reference signs, and overlapping descriptions will be omitted.

As illustrated in FIG. 7, in a rotor 50 of the first variation, a thickness T4 of a first wall 51 forming a frame 59 in the radial direction is smaller than the thickness T1 of the first wall 31 of the embodiment illustrated in FIG. 6 in the radial direction. Note that also in this case, the thickness T4 of the first wall 51 is preferably larger than thicknesses T5 of the second wall 52 and the third wall 53 in the peripheral direction.

As illustrated in FIG. 7, in the first variation, a first magnet 61 having a shape different from the shape of the first magnet 41 in the embodiment is disposed in a hole 58 surrounded by the frame 59. In the first variation, the first magnet 61 is surrounded by two second magnets 62 in the peripheral direction. In the first variation, the two second magnets 62 have substantially the same shape. Directions M8 and M9 of the magnetic fluxes of the two second magnets 62 are directed in directions opposite to each other.

In the configuration including the first magnet 61 and the second magnet 62 as illustrated in FIG. 7, manufacturing is easy. On the other hand, in the configuration including the first magnet 41, the second magnet 42, and the third magnet 43 as illustrated in FIG. 4, the influence of demagnetization can be reduced. By increasing the size of the first magnet 61, the magnetic flux flowing from the first magnet 61 to the stator 10 can be increased.

Figure 8:
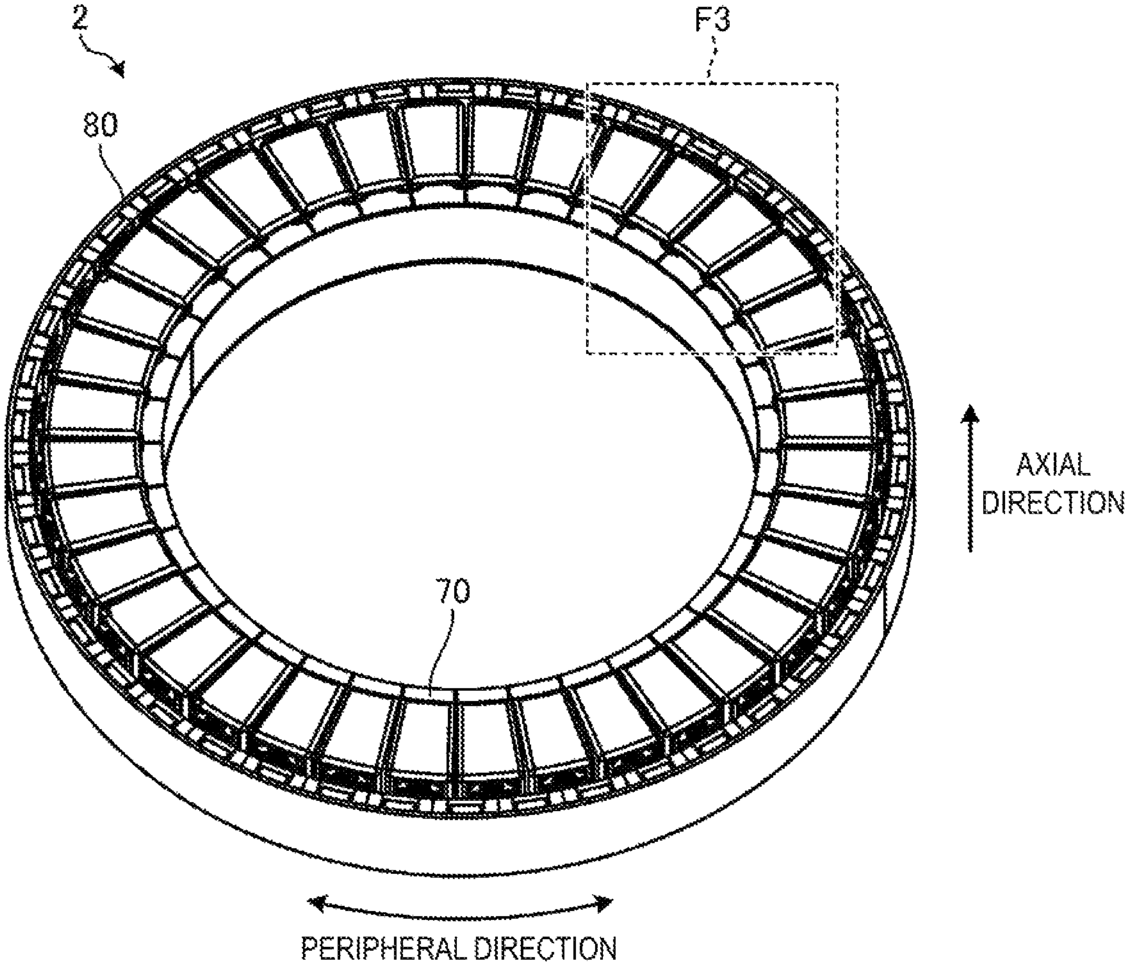
FIG. 8 is a perspective view illustrating an example of a motor of a second variation.
Figure 9:
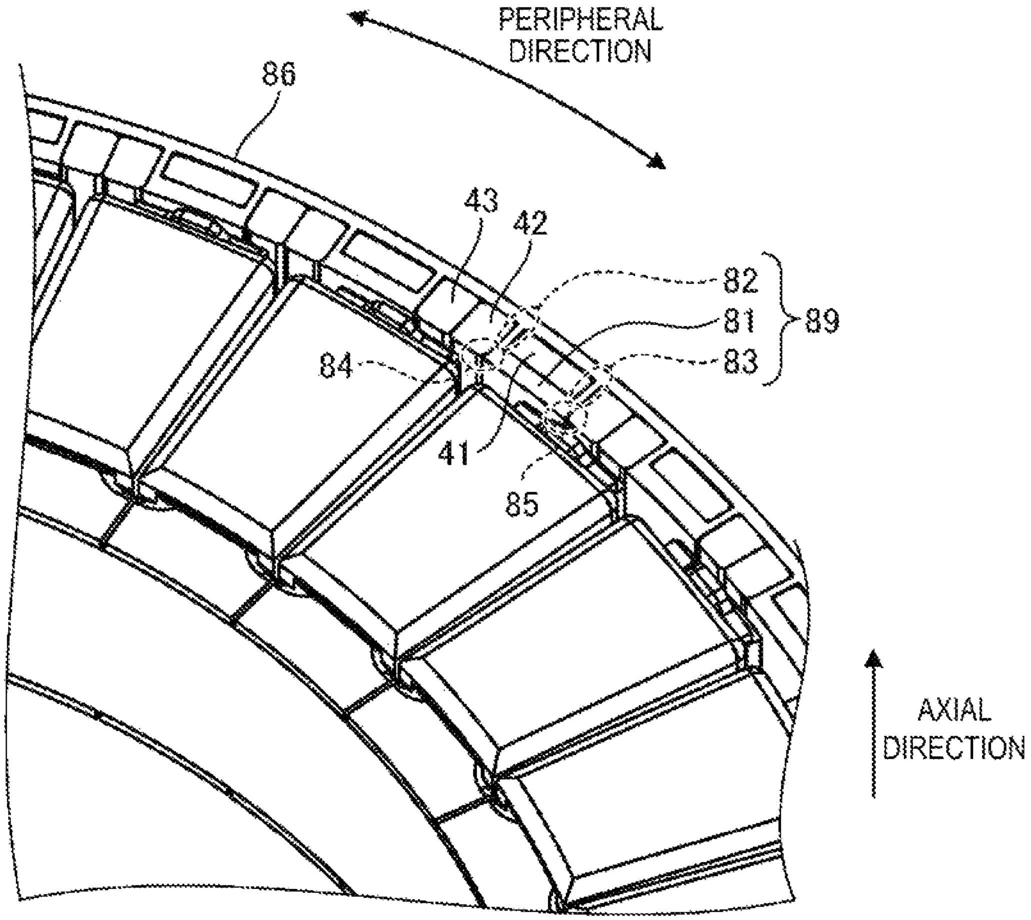
FIG. 9 is an enlarged perspective view illustrating an example of the motor of the second variation.

The motor 1 of the embodiment is an inner rotor motor, but no such limitation is intended. For example, an outer rotor motor as illustrated in FIG. 8 may be employed. FIG. 8 is a perspective view illustrating an example of a motor of a second variation. FIG. 9 is an enlarged perspective view illustrating an example of the motor according to the second variation. FIG. 9 is an enlarged view of a portion illustrated in a frame F3 in FIG. 8.

As illustrated in FIG. 8, in a motor 2 of the second variation, a rotor 80 is disposed radially outward of a stator 70. As illustrated in FIG. 9, in the outer rotor motor 2, an annular portion 86 of the rotor 80 is positioned radially outward of the magnet 40. For example, the first magnet 41 is disposed in a frame 89 formed by a first wall 81, a second wall 82, and a third wall 83.

In this case, the magnet 40 is less likely to jump out due to centrifugal force. However, as in the embodiment, the amount of magnetic flux can be increased by making the thickness of the first wall 81 in the radial direction thicker than the thicknesses of the second wall 82 and the third wall 83 in the peripheral direction and providing the rotor 80 with engaging portions 84 and 85.

Note that the motor 2 of the second variation is also a flat motor as with the motor 1 of the embodiment, but no such limitation is intended. In both the inner rotor motor and the outer rotor motor, the length of the motor in the axial direction may be longer than the length in the radial direction.

Figure 10:
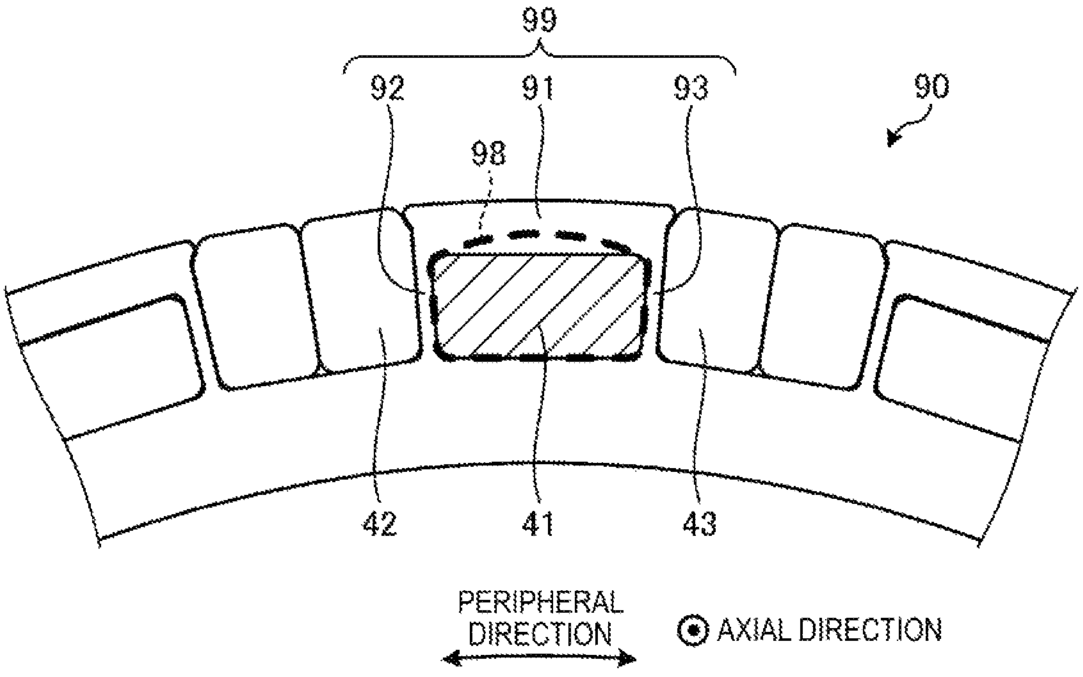
FIG. 10 is an enlarged top view illustrating an example of a rotor of a third variation.
Figure 11:
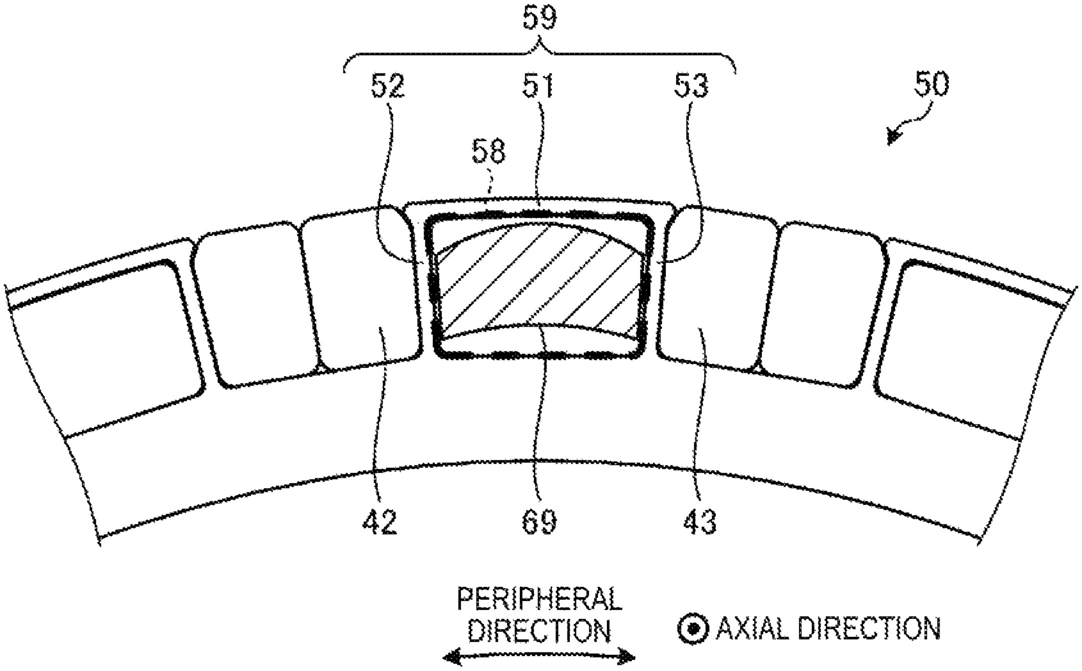
FIG. 11 is an enlarged top view illustrating an example of a rotor of a fourth variation.

Furthermore, in the embodiment, the configuration where both the shape of the hole 38 and the shape of the first magnet 41 are substantially rectangular has been described, but the embodiment is not limited to the configuration. For example, the hole and the magnet may be formed to include a curved shape. As illustrated in FIG. 10 and FIG. 11, a rectangular magnet may be accommodated in a hole including a curved shape, or a magnet including a curved shape may be accommodated in a hole formed in a rectangular shape. FIG. 10 is an enlarged top view illustrating an example of a rotor of a third variation. FIG. 11 is an enlarged top view illustrating an example of a rotor of a fourth variation.

As illustrated in FIG. 10, in a rotor 90 of the third variation, a hole 98 surrounded by a frame 99 formed by a first wall 91, a second wall 92, and a third wall 93 has a shape with a radially outer surface curved in an arc shape. As in the embodiment, the first magnet 41 is disposed in the hole 98 of the third variation.

As illustrated in FIG. 11, in the fourth variation, a first magnet 69 is disposed in the hole 58 of the rotor 50 as in the first variation. The first magnet 69 is different from the first magnet 41 of the embodiment and the first magnet 61 of the first variation in that both the radially outer surface and the radially inner surface are curved in an arc shape.

As described above, the radially outer surface and the radially inner surface of the frame of the rotor and the first magnet may have different shapes from each other or may have substantially the same shape. The shape of the radially outer surface and the shape of the radially inner surface of the frame of the rotor may be different from each other as illustrated in FIG. 10 or may be substantially the same. Similarly, in the first magnet, the shape of the radially outer surface and the shape of the radially inner surface may be different from each other or may be substantially the same as illustrated in FIG. 11.

An embodiment and variations of the present invention have been described above. However, the present invention is not limited to the embodiment and the variations and can be variously modified without departing from the gist of the present invention. Various modifications within a scope not departing from the gist are also included in the technical scope of the present invention, and this is obvious to a person having skill in the art from the description of the claims.

REFERENCE SIGNS LIST

1, 2 Motor, 10, 70 Stator, 11 Stator core, 12 Insulator, 13 Coil, 14 End portion of conducting wire, 20, 50, 80, 90 Rotor, 30 Yoke, 31, 51, 81, 91 First wall, 32, 52, 82, 92 Second wall, 33, 53, 83, 93 Third wall, 34, 35, 84, 85 Rib (engaging portion), 36, 86 Annular portion, 38, 58, 98 Hole, 39, 59, 89, 99 Frame, 41, 61, 69 First magnet, 42, 62 Second magnet, 43 Third magnet, G1 Magnetic gap

The invention claimed is:

1. A motor comprising:

a rotor including a yoke, a plurality of first magnets, a second magnet opposed to one of the first magnets via the yoke, and a third magnet; and a stator, wherein the yoke includes a plurality of holes and a plurality of frames surrounding the holes, the frames comprising a first frame and a second frame adjacent to each other in a peripheral direction, each of the first magnets is disposed in the holes of the yoke, the second magnet and the third magnet are arranged between the first frame and the second frame, the second magnet includes a first surface opposed to the first frame of the yoke in a peripheral direction and a second surface opposed to the stator in a radial direction, the third magnet includes a first surface and a second surface, the first surface of the third magnet being opposed to the second frame of the yoke in the peripheral direction, the second surface of the third magnet being opposed to the stator in the radial direction, and the second surface of the second magnet and the second surface of the third magnet form an outer peripheral face or an inner peripheral face of the rotor.

2. The motor according to claim 1, wherein each of the frames includes a first wall, a second wall, and a third wall, the yoke includes an annular portion adjacent to the second wall and the third wall in the radial direction, and each of the first magnets is located between the first wall and the annular portion in the radial direction.

3. The motor according to claim 2, wherein a thickness-of the first wall in the radial direction is larger than a thickness of the second wall or a thickness of the third wall in the peripheral direction.

4. The motor according to claim 2, wherein the second wall is located between one of the first magnets and the first surface of the second magnet in the peripheral direction, and p1 the third wall is located between the first magnet and the first surface of the third magnet.

5. The motor according to claim 2, comprising a magnetic gap extending in the peripheral direction, wherein a first portion of the magnetic gap is formed by the first wall and the stator in the radial direction, a second portion of the magnetic gap is formed by the second surface of the second magnet and the stator in the radial direction, and the second magnet is in contact with a first side surface of the annular portion in the radial direction, the first side surface extending in the peripheral direction.

6. The motor according to claim 5, comprising a magnetic gap extending in the peripheral direction, wherein a third portion of the magnetic gap is formed by the second surface of the third magnet and the stator in the radial direction, and the third magnet is in contact with a second side surface of the annular portion in the radial direction, the second side surface extending in the peripheral direction.

7. The motor according to claim 2, wherein a first engaging portion is provided at a portion where the second wall and the first wall intersect with each other, and the second magnet is engaged with the first engaging portion.

8. The motor according to claim 2, wherein a direction of a magnetic flux of each of the first magnets is directed in a radial direction, and a direction of a magnetic flux of the second magnet is directed in a direction inclined in the peripheral direction with respect to the direction of the magnetic flux of each of the first magnets.

9. The motor according to claim 2, wherein the third magnet is opposed to one of the first magnets via the yoke.

10. The motor according to claim 9, wherein a second engaging portion is provided at a portion where the third wall and the first wall intersect with each other, and the third magnet is engaged with the second engaging portion.

11. The motor according to claim 2, wherein a direction of a magnetic flux of each of the first magnets is directed in the radial direction, and a direction of a magnetic flux of the third magnet is directed in a direction inclined in the peripheral direction with respect to the direction of the magnetic flux of each of the first magnets, the direction of the magnetic flux of the third magnet being different from a direction of a magnetic flux of the second magnet.

12. The motor according to claim 2, wherein a thickness of the first wall in the radial direction is smaller than a thickness of each of the first magnets in the radial direction.

13. A motor comprising:

a rotor including a yoke, a first magnet, and a second magnet opposed to the first magnet via the yoke; and a stator, wherein the yoke includes a hole and a frame surrounding the hole, the first magnet is disposed in the hole of the yoke, the second magnet includes a first surface opposed to the frame of the yoke in a peripheral direction and a second surface opposed to the stator in a radial direction, the frame includes a first wall, a second wall and a third wall, the first wall extending in the peripheral direction, the second wall and the third wall extending in the radial direction, the yoke includes an annular portion adjacent to the second wall and the third wall in the radial direction, the second surface of the second magnet forms an outer peripheral face or an inner peripheral face of the rotor, and a thickness of the first wall is smaller than a thickness of the first magnet in the radial direction.

14. The motor according to claim 13, wherein the first magnet is located between the first wall and the annular portion in the radial direction.

15. The motor according to claim 14, wherein a thickness of the first wall in the radial direction is larger than a thickness of the second wall or a thickness of the third wall in the peripheral direction.

16. The motor according to claim 13, wherein the second wall is located between the first magnet and the first surface of the second magnet in the peripheral direction.

17. The motor according to claim 13, comprising a magnetic gap extending in the peripheral direction, wherein a first portion of the magnetic gap is formed by the first wall and the stator in the radial direction, a second portion of the magnetic gap is formed by the second surface of the second magnet and the stator in the radial direction, and the second magnet is in contact with a first side surface of the annular portion in the radial direction, the first side surface of the annular portion extending in the peripheral direction.

18. The motor according to claim 13, wherein a first engaging portion is provided at a portion where the second wall and the first wall intersect with each other, and the second magnet is engaged with the first engaging portion.

19. The motor according to claim 13, wherein a direction of a magnetic flux of the first magnet is directed in a radial direction, and a direction of a magnetic flux of the second magnet is directed in a direction inclined in the peripheral direction with respect to the direction of the magnetic flux of the first magnet.

20. The motor according to claim 13, wherein the rotor includes a third magnet opposed to the first magnet via the yoke, and the third magnet includes a first surface opposed to the frame of the yoke in the peripheral direction and a second surface opposed to the stator in the radial direction.

21. The motor according to claim 20, wherein in the peripheral direction, the first magnet is located between the second magnet and the third magnet, and the third wall is located between the first magnet and the first surface of the third magnet.

22. The motor according to claim 20, comprising a magnetic gap extending in the peripheral direction, wherein a third portion of the magnetic gap is formed by the second surface of the third magnet and the stator in the radial direction, and the third magnet is in contact with a second side surface of the annular portion, the second side surface of the annular portion extending in the peripheral direction.

23. The motor according to claim 20, wherein a second engaging portion is provided at a portion where the third wall and the first wall intersect with each other, and the third magnet is engaged with the second engaging portion.

24. The motor according to claim 20, wherein a direction of a magnetic flux of the first magnet is directed in the radial direction, and a direction of a magnetic flux of the third magnet is directed in a direction inclined in the peripheral direction with respect to the direction of the magnetic flux of the first magnet, the direction of the magnetic flux of the third magnet being different from a direction of a magnetic flux of the second magnet.

* * * * *